United States Patent [19]

Pantzar

[11] Patent Number: 6,016,720
[45] Date of Patent: Jan. 25, 2000

[54] METHOD FOR THE MANUFACTURING OF ROTARY TOOL HOLDERS HAVING SEATS FOR CUTTING INSERTS

[75] Inventor: Goran Pantzar, Årsunda, Sweden

[73] Assignee: Sandvik Aktiebolag, Sandviken, Sweden

[21] Appl. No.: 08/842,357

[22] Filed: Apr. 24, 1997

[30] Foreign Application Priority Data

Apr. 26, 1996 [SE] Sweden ................................. 9601625

[51] Int. Cl.⁷ ...................................................... B21K 5/20
[52] U.S. Cl. ................................................. 76/115; 407/46
[58] Field of Search ................................ 76/115, DIG. 2, 76/104.1; 407/40, 48, 103

[56] References Cited

U.S. PATENT DOCUMENTS 5,171,109  12/1992  Arai et al. ............................. 76/115 X

*Primary Examiner*—Douglas D. Watts
*Attorney, Agent, or Firm*—Burns, Doane, Swecker & Mathis, L.L.P.

[57] ABSTRACT

A rotary tool holder having a plurality of cutting insert-receiving seats is manufactured by rough-forming the seats in a steel body, then hardening the body, and thereafter finish-forming the seats.

8 Claims, 3 Drawing Sheets

METHOD FOR THE MANUFACTURING OF ROTARY TOOL HOLDERS HAVING SEATS FOR CUTTING INSERTS

BACKGROUND OF THE INVENTION

The present invention relates to a method for the manufacturing of cutting tools, such as milling cutter bodies with seats for indexable cutting inserts, and drills with seats for several cutting inserts of a hard material.

When milling, the tool is given a rotating main motion at the same time as the workpiece or the tool performs a rectilinear or a rotating feeding motion. A feeding along a curve may also take place in copying milling machines and in numerically operated milling machines. For instance, the milling cutter body may consist of a face milling cutter, a corner milling cutter or a cylindrical milling cutter. These have in common that they usually carry a plurality of cutting inserts of a hard material, such as cemented carbide. These cutting inserts are normally of the indexable type, i.e. they may be detached and turned or "indexed" when a cutting edge has been worn out and the operator wishes to turn a new cutting edge into the operative position. To obtain a fine and smooth surface on the workpiece, it is necessary that the operative abutting edges of the cutting inserts describe substantially identical rotation orbits. For instance in a face cutting miller or a corner cutting miller the inserts should have substantially the same axial and radial positions in the milling cutter body. This implies extraordinarily high precision requirements when manufacturing the insert seats in the milling cutter body. If for instance the axial positioning is unsatisfactory, a so-called axial throw arises, which causes a deteriorated surface smoothness.

In several different face cutting miller applications, very high demands are set on the surface smoothness and $R_a$ values of maximally 1.5 $\mu$m, $R_z$ values of between 10 and 15 $\mu$m, $R_{max}$ of 10 $\mu$m and WT values of between 5 and 8 $\mu$m often occur. In order to achieve these surface criteria, it is necessary to adjust the cutting edges with a very high precision, both absolutely and relative to the other cutting edges in the milling cutter body. Thus, the axial height difference between two cutting edges should not exceed a few $\mu$m. Suitably, one should be able to position cutting edges within an axial tolerance range of 5 $\mu$m, and preferably even less. This has proved to be impossible because of the internal differences that occur between the positions in the milling cutter body of the insert seats, and thereby, also the cutting inserts.

According to one known technique, a milling cutter body is manufactured by starting off from a piece of bar material of tool steel, such as, e.g., one with the code designation 42CrMo4H in toughened condition (hardness 270–310 HB). Shape and form are established by cutting machining, such as turning of the basic shape and milling out of the seats for the cutting inserts. Further, the bottom support surfaces of the insert seats are provided with a central, threaded hole for receiving the locking screw of the cutting insert, or a tubular shim screw for the fastening of a shim to the cutting insert. When the shaping of the milling cutter body is terminated, it is hardened. The purpose of hardening is to give the steel (in this case, normally the tool steel) a suitable hardness, either throughout its entire thickness or only to a certain depth under the surface. By heating to the austenitic range, followed by a fast cooling in water, oil or air (depending on the composition) martensite is obtained. The hardness of the martensite depends on the carbon content. Milling cutter bodies are either locally hardened in the regions around the insert seats, or they are hardened throughout, normally to a hardness degree of between 40 and 52 $H_RC$, preferably between 43 and 47 $H_RC$. During this hardening and the subsequent oil cooling, it is unavoidable that yieldings and distortions in the material bring about minor shifts of the positions of the insert seats. Thus, differences of 50 to 60 $\mu$m may for instance occur between the axial positions of two insert seats. Thereby, the positions of the cutting inserts will of course deviate to the same extent. In many cases, this may turn out to be unacceptable, and therefore, in some applications, a possibility must exist to finely adjust the cutting edges axially, for instance by fastening the cutting inserts in movable cassettes; see for instance Swedish Patent 501 915 (Hessman et al.).

Thus, a primary object of the present invention is to form cutting positions in a milling cutter body with an increased position precision.

A second object of the present invention is to reduce the axial throw between two insert seats in a milling cutter body to less than 20 $\mu$m, preferably 10 $\mu$m.

Still another object of the present invention is to avoid complicated constructions with a plurality of different machine parts.

SUMMARY OF THE INVENTION

These and further apparent objects have been attained by a method of manufacturing a rotary tool holder (such as a milling tool holder or a drill) having a plurality of insert seats, each seat including support surfaces adapted to engage a cutting insert. The method comprises hardening a steel body at least in regions thereof in which insert seats are to be disposed, and thereafter forming finished support surfaces of insert seats in the hardened regions.

Preferably, the support surfaces are rough-formed prior to the hardening step and are finish-formed after the hardening step.

BRIEF DESCRIPTION OF THE DRAWINGS

The objects and advantages of the invention will become apparent from the following detailed description of a preferred embodiment thereof in connection with the accompanying drawing in which like numerals designate like elements, and in which.

DETAILED DESCRIPTION OF A PREFERRED EMBODIMENT

Figure 1:
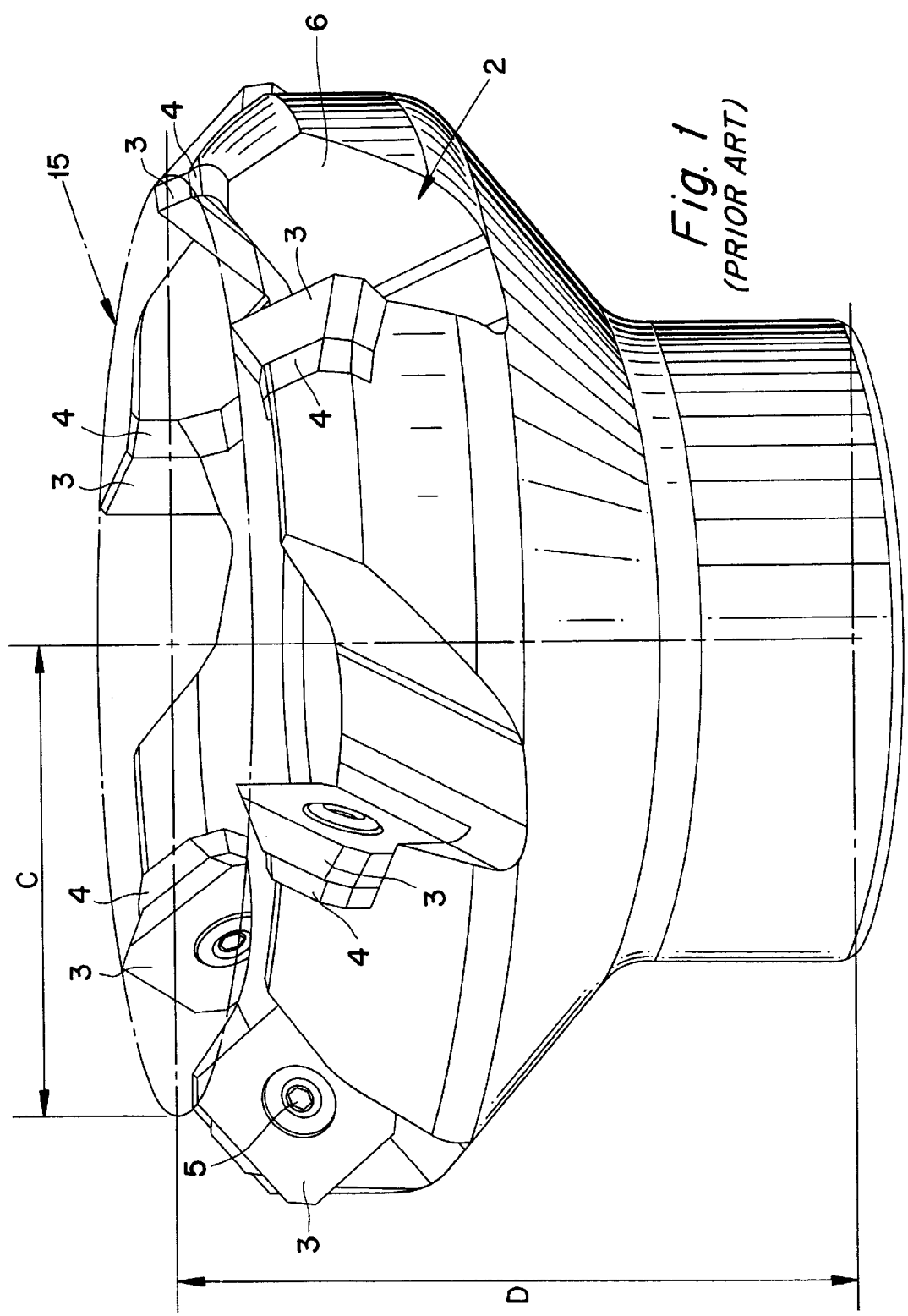
FIG. 1 shows a milling cutter body in perspective, obliquely from above, on which the invention may be applied.

FIG. 1 shows generally a milling cutter body 1 with six insert seats 2, according to the prior art. In 30 each insert seat there is mounted a cutting insert 3 and a shim 4, which have been fastened in the insert seat by means of a locking screw 5. In front of each cutting insert, in the direction of rotation, there is a milled-out chip pocket 6.

Figure 2:
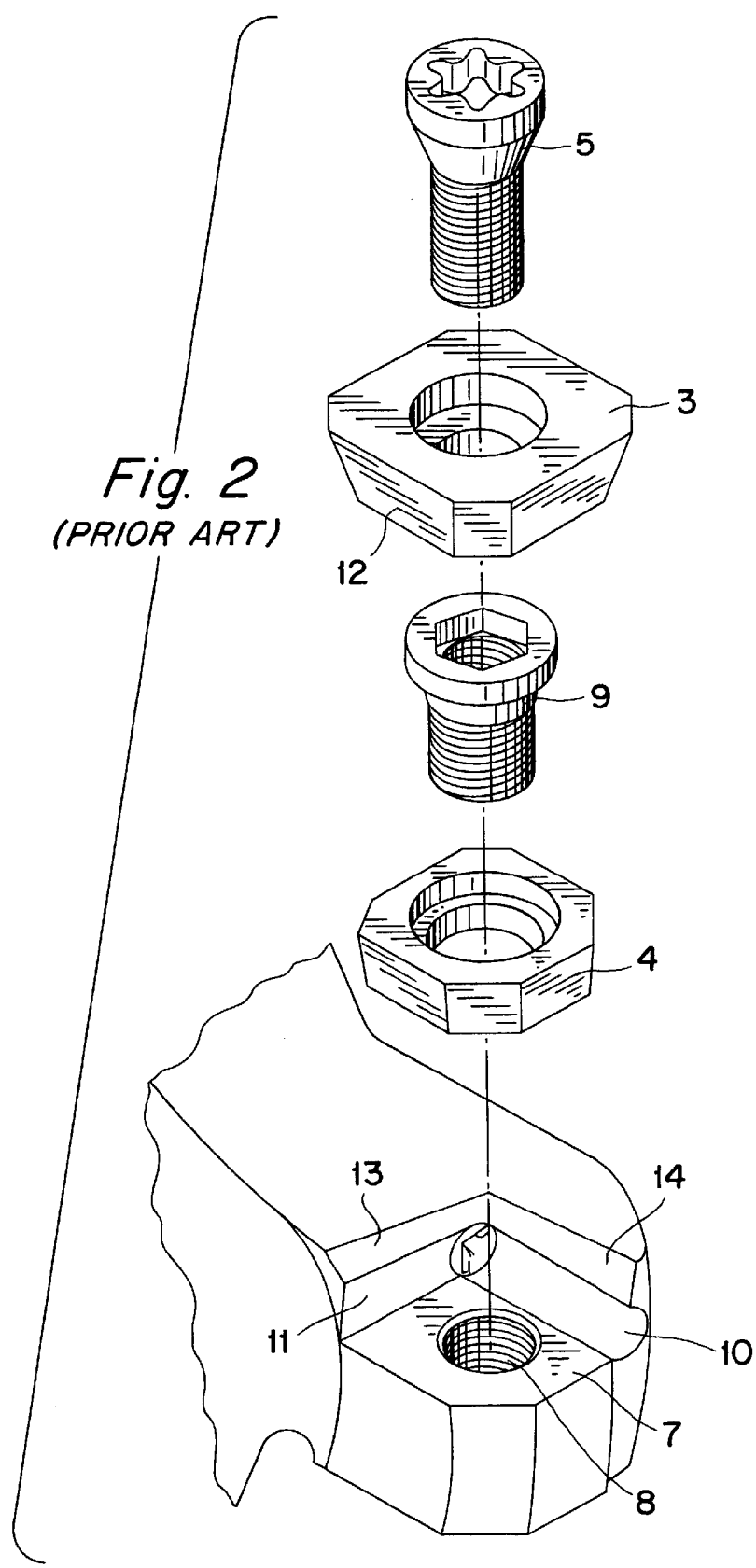
FIG. 2 shows an exploded view of an insert seat obliquely from above, on which the invention may be applied.

The mounting per se of a cutting insert may be clearly seen in FIG. 2. Normally, an insert seat comprises a bottom support surface 7 with a threaded hole 8 intended for screwing-in a shim screw 9. The head of the shim screw clamps the shim 4. Usually, this shim does not bear upon the side surfaces 10 and 11, which thus are free surfaces. On top of the shim 4 is clamped a cutting insert 3, for instance a square indexable cutting insert, by means of a locking screw 5, which is threaded into the inner thread of the shim screw 9. Two of the side surfaces 12 of the cutting insert bear upon the abutment support surfaces 13 and 14, respectively, in the insert seat. Normally, these surfaces 13, 14 are angled to correspond to the positive orientation of the side surfaces 12. Further, in FIG. 1 the rotation plane of the operative cutting corners is illustrated by an imaginary ring 15. As mentioned above, it is a goal that all operative cutting corners lie in this plane, but according to known techniques, differences of up to 60 μm between two cutting inserts may occur. This depends greatly on fluctuations that arise during the hardening.

Figure 3:
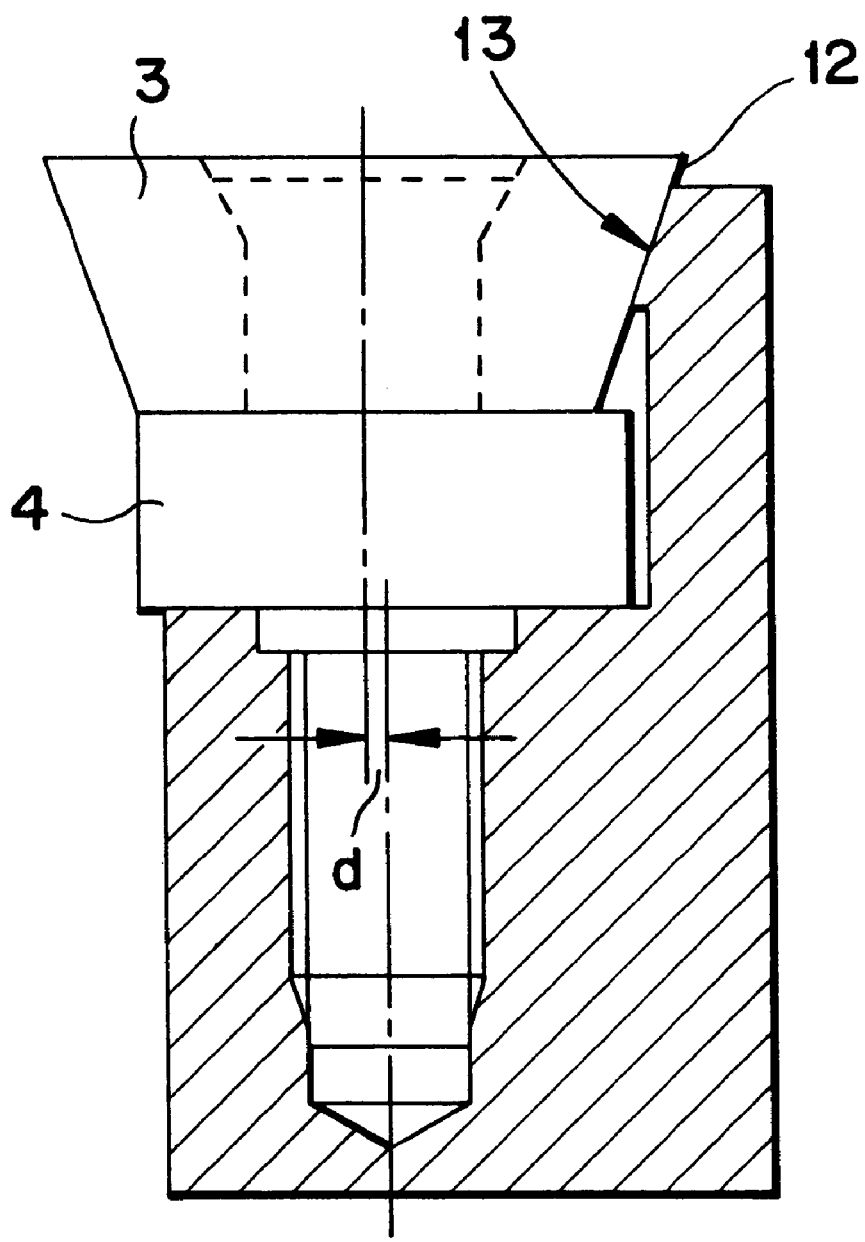
FIG. 3 shows a cross-section of an insert seat.

FIG. 3 shows an insert seat with a cutting insert 3 and a shim 4. The side surface 12 bears against the abutment support surface 13 of the insert seat. The eccentric distance d, which for illustrative purposes is shown strongly exaggerated, designates the prestressing, which, as known, forces the cutting insert against the support surfaces 13, 14, so that a strong and stable bearing is obtained between the side surfaces of the cutting insert and the support surfaces of the insert seat.

According to the invention, a surprisingly better precision for the positioning of the insert seats is obtained, and thereby also a corresponding improvement of the positioning of the operative cutting edges, by the fact that the manufacturing of the insert seats is made after the hardening of the carrier or holder as such, i.e., in this case the milling cutter body. For instance, by milling out the bottom support surface 7 and the side support surfaces 13, 14 of the insert seat, and by drilling and threading the hole 8, after and not before the hardening of the milling cutter body, the axial throw of the inserts seats has been reduced to less than 10 μm.

According to the method of the invention, one starts off from the same types of tool steel as in the prior art. First the steel bar is rough-formed (e.g., rough-turned) and thereafter it is neutral-hardened and annealed in accordance with a known technique to about 45 $H_R C$. As known, the purpose of the annealing is to give to the steel a suitable hardness whereby an improved toughness is also attained. Only thereafter are the finished insert seats and the chip pockets produced by finish-forming (e.g., by finish-turning). By rough-turning before the hardening, a sufficient hardening depth is accomplished by means of practically any known cooling oil.

As mentioned above, after the hardening has been performed, the manufacturing of the insert seats per se occurs. By means of the modern cutting tools of today, the insert seats can be formed in principle by the same types of tools as hitherto used for unhardened steel. Thus, end mills and threading taps of solid cemented carbide and/or Coronite® are used. Thereby, surprisingly low axial and radial throws, respectively, have been obtained. The axial and radial deviations of the insert seats, i.e. the measures D and C, respectively, in FIG. 1, have varied by less than 10 μm, between the lowest and the highest value.

A further obtained advantage depends on the radically reduced radial throw (i.e. variations of the distance C), namely a considerably increased cutting insert life. Thus, by the reduced radial throw, the wear is considerably reduced on the operative main cutting edges. This is of major importance when machining wearing materials, such as titanium and titanium-based materials.

Although the present invention has been described in connection with a preferred embodiment thereof, it will be appreciated by those skilled in the art that additions, modifications, substitutions and deletions not specifically described may be made without departing from the spirit and scope of the invention as defined by the appended claims.

What is claimed is:

1. A method for manufacturing a metal cutting tool having at least one recessed insert seat including insert-engaging support surfaces adapted to engage and support a cutting insert, the method comprising the steps of:

A) hardening a steel body at least in a region thereof on which the at least one insert seat is to be disposed, and thereafter B) working the hardened region for shaping finished insert-engaging support surfaces therein, and drilling and threading a hole in the hardened region.

2. The method according to claim 1, further comprising, prior to step A, the step of rough-forming the support surfaces; and step B comprises finish-forming the support surfaces.

3. The method according to claim 2 wherein the rough-forming is performed by rough-turning, and the finish-forming is performed by finish-turning.

4. The method according to claim 1, wherein step A comprises hardening the entire steel body.

5. The method according to claim 1 wherein step A comprises hardening only a portion of a thickness of the body.

6. The method according to claim 1 wherein step A hardens the steel body to a hardness of from 40 to 52 $H_R C$.

7. The method according to claim 1 wherein step A hardens the steel body to a hardness of from 43 to 47 $H_R C$.

8. The method according to claim 1 wherein step B comprises forming, for each seat, a finished bottom support surface and at least two finished abutment support surfaces.

* * * * *